United States Patent Office 3,555,160
Patented Jan. 12, 1971

3,555,160
CHLORONITROPHENYL ESTERS OF POLY-CARBOXYLIC ACIDS AS FUNGICIDES AND NEMATOCIDES
Delta W. Gier, Laurinburg, N.C., and Daniel M. Wasleski, Kansas City, Mo., assignors to Chemagro Corporation, New York, N.Y., a corporation of New York
No Drawing. Filed Oct. 16, 1967, Ser. No. 675,287
Int. Cl. A01n 9/12, 9/24
U.S. Cl. 424—308                                   2 Claims

ABSTRACT OF THE DISCLOSURE

Compounds of the formulae (1) $\quad R_2OOC(CH_2)_nCOOR_1$
(2) $\quad R_2OOCCH=CHCOOR_1$
(3) $\quad R_2OOC\phantom{XXX}COOR_1$, and

(4) $\quad R_2OOC(CH_2)_mS(CH_2)_mCOOR_1$ are useful as fungicides, herbicides and nematocides. $R_1$ and $R_2$ are mono to trihalo mono to dinitrophenyl or mono halo mono methyl nitrophenyl, $m$ is 1, 2 or 3 and $n$ is an integer from 0 to 8. Compounds of Formulae 1, 2 and 3 are plasticizers for cellulose esters and synthetic resins and compounds of Formula 4 are stabilizers for mono and diolefin polymers.

The present invention relates to novel compounds and pesticidal uses thereof.

It is an object of the present invention to prepare novel chloronitrophenyl esters.

Another object is to develop improved compositions and methods for combatting fungi.

An additional object is to develop improved compositions and methods for killing nematodes.

A further object is to develop improved compositions and methods for killing undesired plants.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having the following formulae (1) $\quad R_2OOC(CH_2)_nCOOR_1$
(2) $\quad R_2OOCCH=CHCOOR_1$
(3) $\quad R_2OOC\phantom{XXX}COOR_1$

(4) $\quad R_2OOC(CH_2)_mS(CH_2)_mCOOR_1$ where $R_1$ and $R_2$ are mono to trihalo mono to dinitrophenyl or monohalo monomethyl mononitrophenyl, $m$ is 1, 2 or 3 and $n$ is an integer from 0 to 8, preferably at least 2. The compounds of Formulae 1, 2, 3 and 4 exhibit nematocidal, fungicidal and herbicidal activity.

The compounds of Formulae 1, 2 and 3 also can be employed as plasticizers for cellulose esters e.g. cellulose acetate, cellulose acetate-butyrate and cellulose acetate-propionate and for vinyl chloride resins by milling the compound into the cellulose ester or vinyl chloride resin at a temperature above the melting point of the compound.

The compounds of Formula 4 can be used as stabilizers for monoolefin and polyolefin polymers. Thus they can be added in an amount of 0.1 to 10% to polyethylene or polypropylene or an ethylene propylene copolymer. For example polypropylene can be stabilized by adding 1% of bis (2,4-dichloro-6-nitrophenyl) thiodipropionate to the polypropylene or by adding 0.5% of bis (4-chloro-2-nitrophenyl) thiodipropionate, or 0.75% of bis (2,4,5-trichloro-6-nitrophenyl) thiodipropionate to the polypropylene.

The compounds of the present invention are prepared by reacting 2 moles of the appropriate halonitrophenol with one mole of the appropriate dibasic acid chloride. The reaction is carried out in the presence of a base, e.g. sodium hydroxide, potassium hydroxide or the like in the presence of an inert solvent, e.g. acetone or ethylene glycol dimethyl ether.

As the halonitrophenol there can be employed 2,4,5-trichloro - 6 - nitrophenol, 2,4 - dichloro-6-nitrophenol, 2-chloro-6-nitrophenol, 2-nitro-4-chlorophenol, 2,4,6-trichloro - 5 - nitrophenol, 2,3,4-trichloro-5-nitrophenol, 2-nitro - 3,4 - dichlorophenol, 3-chloro-4-nitrophenol, 2,4,5-tribromo-6-nitrophenol, 2,4 - dibromo - 6 - nitrophenol, 2,4,5-trifluoro-6-nitrophenol, 2-chloro-4,6 - dinitrophenol, 2,3-dichloro-4,6-dinitrophenol, and 4-chloro-3-methyl-2-nitrophenol, 4-chloro-2,6-dinitrophenol.

As the acyl halide for reacting with the halonitrophenol there can be used oxalyl chloride, malonyl chloride, succinyl chloride, glutaryl chloride, adipyl chloride, pimelyl dichloride, suberyl dichloride, azelayl dichloride, sebacyl dichloride, succinyl dibromide, sebacyl dibromide, phthalyl dichloride, phthalyl dibromide, terephthalyl dichloride, isophthalyl dichloride, maleyl dichloride, fumaryl dichloride, thiodipropionyl chloride

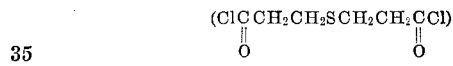

(ClCCH$_2$CH$_2$SCH$_2$CH$_2$CCl)
$\phantom{xxxx}\|\phantom{xxxxxxxxxxx}\|$
$\phantom{xxxx}$O$\phantom{xxxxxxxxxxxx}$O thiodiacetyl chloride and thiodibutyryl dichloride.

Examples of compounds within the present invention are bis (2,4,5-trichloro-6-nitrophenyl) oxalate,
bis (2,4-dichloro-6-nitrophenyl) malonate,
bis (2,4,5-trichloro-6-nitrophenyl) succinate,
bis (2,4,5-tribromo-6-nitrophenyl) succinate,
bis (2,3-dichloro-4,6-dinitrophenyl) succinate,
bis (2,3,4-trichloro-5-nitrophenyl) succinate,
bis (2,4-5-trichloro-6-nitrophenyl) glutarate,
bis (2,4,5-trichloro-6-nitrophenyl) adipate,
bis (2,4,5-trichloro-6-nitrophenyl) pimelate,
bis (2,4,5-trichloro-6-nitrophenyl) suberate,
bis (2,4,5-trichloro-6-nitrophenyl) azealate,
bis (2,4,5-trichloro-6-nitrophenyl) sebacate,
bis (2,4-dichloro-6-nitrophenyl) succinate,
bis (2,4-dichloro-6-nitrophenyl) glutarate,
bis (2,4-dichloro-6-nitrophenyl) adipate,
bis (2,4-dichloro-6-nitrophenyl) azealate,
bis (2,4-dichloro-6-nitrophenyl) sebacate,
bis (4-chloro-3-methyl-2-nitrophenyl) succinate,
bis (4-chloro-3-methyl-2-nitrophenyl) sebacate,
bis (4-bromo-3-methyl-2-nitrophenyl) adipate,
bis (2,6-dichloro-4-nitrophenyl) succinate,
bis (2,6-dichloro-4-nitrophenyl) adipate,
bis (2,6-dichloro-4-nitrophenyl) sebacate,
bis (4-chloro-2,6-dinitrophenyl) succinate,
bis (4-chloro-2,6-dinitrophenyl) glutarate,
bis (4-chloro-2,6-dinitrophenyl) azealate,
bis (4-chloro-2,6-dinitrophenyl) sebacate,
bis (3-chloro-4-nitrophenyl) succinate,
bis (3-chloro-4-nitrophenyl) sebacate,
bis (4-chloro-2,6-dinitrophenyl) adipate,
bis (3-chloro-4-nitrophenyl) adipate,
bis (4-chloro-2-nitrophenyl) succinate,
bis (4-chloro-2-nitrophenyl adipate, bis (4-chloro-2-nitrophenyl) sebacate,
bis (2,4,5-trichloro-6-nitrophenyl) maleate,
bis (2,4,5-trichloro-6-nitrophenyl) fumarate,
bis (2,4-dichloro-6-nitrophenyl) maleate,
bis (2,4-dichloro-6-nitrophenyl) fumarate,
bis (2,4-dibromo-6-nitrophenyl) maleate,
bis (4-chloro-3-methyl-2-nitrophenyl) maleate,
bis (4-chloro-3-methyl-2-nitrophenyl) fumarate,
bis (2,6-dichloro-4-nitrophenyl) maleate,
bis (2,6-dichloro-4-nitrophenyl) fumarate,
bis (2,6-dichloro-3,4-dinitrophenyl) maleate,
bis (4-chloro-2,6-dinitrophenyl) maleate,
bis (4-chloro-2,6-dinitrophenyl) fumarate,
bis (3-chloro-4-nitrophenyl) maleate,
bis (3-chloro-4-nitrophenyl) fumarate,
bis (4-chloro-2-nitrophenyl) maleate,
bis (4-chloro-2-nitrophenyl) fumarate,
bis (2,4,5-trichloro-6-nitrophenyl) phthalate,
bis (2,4,5-tribromo-6-nitrophenyl) phthalate,
bis (2,4,5-trichloro-6-nitrophenyl) terephthalate,
bis (2,4,5-trichloro-6-nitrophenyl) isophthalate,
bis (2,4-dichloro-6-nitrophenyl) isophthalate,
bis (2,4-dichloro-6-nitrophenyl) phthalate,
bis (2,4-dichloro-6-nitrophenyl) terephthalate,
bis (4-chloro-3-methyl-2-nitrophenyl) phthalate,
bis (4-bromo-3-methyl-2-nitrophenyl) terephthalate,
bis (4-chloro-3-methyl-2-nitrophenyl) isophthalate,
bis (2,6-dichloro-4-nitrophenyl) phthalate,
bis (2,6-dichloro-4-nitrophenyl) terephthalate,
bis (2,6-dichloro-4-nitrophenyl) isophthalate,
bis (4-chloro-2,6-dinitrophenyl) phthalate,
bis (4-chloro-2,6-dinitrophenyl) terephthalate,
bis (4-chloro-2,6-dinitrophenyl) isophthalate,
bis (3-chloro-4-nitrophenyl) phthalate,
bis (3-chloro-4-nitrophenyl) isophthalate,
bis (3-chloro-4-nitrophenyl) terephthalate,
bis (4-chloro-2-nitrophenyl) phthalate,
bis (4-chloro-2-nitrophenyl) isophthalate,
bis (4-chloro-2-nitrophenyl) terephthalate,
bis (2,4,5-trichloro-6-nitrophenyl) thiodiacetate,
bis (2,4,5-tribromo-6-nitrophenyl) thiodipropionate,
bis (2,4,5-trichloro-6-nitrophenyl) thiodipropionate,
bis (2,4,5-trichloro-6-nitrophenyl) thiodibutyrate,
bis (2,4-dichloro-6-nitrophenyl) thiodiacetate,
bis (2,4-dichloro-6-nitrophenyl) thiodipropionate,
bis (4-chloro-3-methyl-2-nitrophenyl) thiodiacetate,
bis (4-chloro-3-methyl-2-nitrophenyl) thiodipropionate,
bis (2,6-dichloro-4-nitrophenyl) thiodiacetate,
bis (2,6-dichloro-4-nitrophenyl) thiodipropionate,
bis (4-chloro-2,6-dinitrophenyl) thiodiacetate,
bis (4-chloro-2,6-dinitrophenyl) thiodipropionate,
bis (3-chloro-4-nitrophenyl) thiodiacetate,
bis (3-chloro-4-nitrophenyl) thiodipropionate,
bis (4-chloro-2-nitrophenyl) thiodiacetate,
and bis (4-chloro-2-nitrophenyl) thiodipropionate.

The compounds of the present invention can be used alone or they can be applied together with inert solids to form dusts, or can be suspended in a suitable liquid diluent, preferably comprising water.

There can also be added surface active agents or wetting agents and/or inert solids in the liquid formulations. In such case, the active ingredient can be from 0.01 to 95% by weight of the entire composition.

In place of water there can be employed organic solvents as carriers, e.g., hydrocarbons such as benzene, toluene, xylene, kerosene, diesel oil, fuel oil and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g., ethylene glycol monomethyl ether and diethylene glycol monomethyl ether, alcohols, e.g., ethanol, methanol, isopropanol, amyl alcohol, ethylene glycol, propylene glycol, butyl carbitol acetate and glycerine. Mixtures of water and organic solvents, either as solutions or emulsions, can be employed.

The novel compounds can also be applied as aerosols, e.g., by dispersing them in air by means of a compressed gas such as dichlorodifluoromethane or trichlorofluoromethane and other Freons, for example.

The compounds of the present invention can also be applied with adjuvants or carriers such as talc, pyrophyllite, synthetic fine silica, attapulgus clay (attaclay), kieselguhr, chalk, diatomaceous earth, lime, calcium carbonate, bentonite, fuller's earth, cottonseed hulls, wheat flour, soybean flour pumice, tripoli, wood flour, walnut shell flour, redwood flour and lignin.

As stated, it is frequently desirable to incorporate a surface active agent in the compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylbenzene sulfonates having 10 to 18 carbon atoms in the alkyl group, alkylphenol ethylene oxide condensation products, e.g., p-isooctylphenol condensed with 10 ethylene oxide units, soaps, e.g., sodium stearate and potassium oleate, sodium salt of propylnaphthalene sulfonic acid (di-2-ethylhexyl), ester of sodium sulfosuccinic acid, sodium lauryl sulfate, sodium salt of the sulfonated monoglyceride of cocoanut fatty acids, sorbitan, sesquioleate, lauryl trimethyl ammonium chloride, octadecyl trimethyl ammonium chloride, polyethylene glycol lauryl ether, polyethylene esters of fatty acids and rosin acids, e.g., Ethofat 7 and 13, sodium N-methyl-N-oleyltaurate, Turkey Red oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide-propylene oxide condensation products, e.g., Pluronic 61 (molecular weight 1,000), sorbitan sesquioleate, polyethylene glycol ester of tall oil acids, sodium octyl phenoxyethoxyethyl sulfate, tris (polyoxyethylene) sorbitan monostearate (Tween 60), and sodium dihexyl sulfosuccinate.

The solid and liquid formulations can be prepared by any of the conventional procedures. Thus, the active ingredient, in finely divided form if a solid, may be tumbled together with finely divided solid carrier. Alternatively, the active ingredient in liquid form, including solutions, dispersions, emulsions and suspensions thereof, may be admixed with the solid carrier in finely divided form.

The compounds of the present invention can be applied to soil, growing plants, e.g., trees, cotton plants, wheat and other grain plants, vegetable plants, seeds and fabrics.

Unless otherwise indicated, all parts and percentages are by weight.

EXAMPLE I

In preparing the compounds set forth in Table I a solution of 0.1 mole of the appropriate chloronitrophenol and 10 ml. of 10 molar aqueous sodium hydroxide in 200 ml. of acetone was placed in a 400 ml. beaker 0.05 mole of the appropriate acid chloride was added slowly to the agitated solution. (The equation for the reaction is $$2R_1OH + ClOCR_3COCl + 2NaOH \rightarrow R_1OOCR_3COOR_1 + 2NaCl + 2H_2O)$$

Stirring was continued at room temperature for 10 to 15 minutes. The resulting solution was poured in 200 ml. of chloroform and was subsequently washed with two 500 ml. portions of water. After drying over calcium sulfate, the chloroform was removed in a rotary evaporator under vacuum leaving the desired esters in fairly high purity.

In Table I there are set forth the compounds having the formula

where R is substituted phenyl, the substituents on the phenyl being indicated in the R column of Table I. In Table I when Z is $C_2H_2$ the compound is a maleate.

TABLE I

| Compound: | R | Z | X | Y | Percent yield | M.P., °C. |
|---|---|---|---|---|---|---|
| 1 | 2,4,5-trichloro-6-nitro | $C_7H_{14}$ | | | 70 | 107 |
| 2 | 2,4-dichloro-6-nitro | $C_7H_{14}$ | | | 74 | 92 |
| 3 | ---do--- | $CH_2$ | S | $CH_2$ | 72 | 101 |
| 4 | 4-chloro 2,6-dinitro | $C_2H_2$ | | | 80 | 155 |
| 5 | 2,6-dichloro-4-nitro | $C_2H_2$ | | | 65 | 116 |
| 6 | 4-chloro-2-nitro | $C_4H_8$ | | | 75 | 116 |
| 7 | ---do--- | $C_2H_4$ | S | $C_2H_4$ | 80 | 88 |
| 8 | 2,4-dichloro-6-nitro | $C_2H_2$ | | | 84 | 198 |
| 9 | ---do--- | $C_4H_8$ | | | 92 | 120 |
| 10 | ---do--- | $C_8H_{16}$ | | | 88 | 105 |
| 11 | 4-chloro-2-nitro | $C_2H_2$ | | | 45 | 160 |
| 12 | 2,4,5-trichloro-6-nitro | $C_4H_8$ | | | 30 | 160 |
| 13 | ---do--- | 1,2-phenylene | | | 84 | 158 |
| 14 | ---do--- | 1,3-phenylene | | | 90 | 199 |
| 15 | ---do--- | $C_2H_2$ | | | 77 | 240 |
| 16 | 2,4-dichloro-6-nitro | 1,2-phenylene | | | 87 | 190 |
| 17 | ---do--- | 1,3-phenylene | | | 85 | 185 |
| 18 | ---do--- | 1,4-phenylene | | | 88 | 210 |
| 19 | 4-chloro-3-methyl-2-nitro | $C_2H_2$ | | | 92 | 213 |
| 20 | 2,6-dichloro-4-nitro | $C_4H_8$ | | | 85 | 92 |
| 21 | ---do--- | $C_2H_4$ | | | 88 | 186 |
| 22 | ---do--- | $C_8H_{16}$ | | | 85 | 86 |
| 23 | 4-chloro-2,6-dinitro | $C_4H_8$ | | | 80 | 170 |
| 24 | ---do--- | $C_7H_{14}$ | | | 82 | 73 |
| 25 | ---do--- | $C_8H_{16}$ | | | 87 | 111 |
| 26 | 3-chloro-4-nitro | $C_4H_8$ | | | 77 | 113 |
| 27 | ---do--- | $C_8H_{16}$ | | | 80 | 88 |
| 28 | ---do--- | $C_2H_2$ | | | 80 | 156 |
| 29 | 4-chloro-2-nitro | $C_2H_4$ | | | 90 | 189 |
| 30 | ---do--- | $C_8H_{16}$ | | | 91 | 79 |

The compounds of the present invention in many instances were applied as wettable powders consisting of 50% of the active ingredient, 46% ultra fine silica (Hi-Sil), 2% sodium lignin sulfonate and 2% Pluronic L-61 (polyethylene oxidepolypropylene oxide adduct molecular weight about 1000). This wettable powder is hereinafter designated as Formulation A.

EXAMPLE II

The compounds of the present invention are useful as nematocides, e.g. against saprophytic nematodes such as Panagrellus and Rhabditis and against parasitic nematodes such as Meloidogyne. The saprophytic nematide tests recorded in Table II were carried out in water as the medium with *Panagrellus* spp. and *Rhabditis* spp. at room temperature. The results were recorded as percent kill after a 2-day incubation period. The blank mortality was 0–10% kill. The compounds were tested at the indicated rates in parts per million.

TABLE II

| | 400 p.p.m. | 200 p.p.m. | 25 p.p.m. |
|---|---|---|---|
| Compound: | | | |
| 1 | 80 | 80 | 50 |
| 2 | 100 | 100 | 100 |
| 3 | 80 | 80 | 50 |
| 4 | 100 | 100 | 50 |
| 5 | 100 | 100 | 30 |
| 6 | 100 | 100 | 10 |
| 7 | 100 | 100 | 10 |

The compounds of the present invention have low mammalian toxicity and are non-corrosive. Many of the compounds also are only slightly phytotoxic and hence can be applied to growing crops since they will kill nematodes when applied at a rate sufficiently low not to kill the crops.

EXAMPLE III

Formulation A was added to agar cultures of fungi. In Table III 10 indicates 100% effectiveness and 0 indicates no effectiveness. The concentrations are expressed in parts per million of active ingredient. In Table III for each compound the rate A is 500 p.p.m., rate B is 100 p.p.m. and rate C is 10 p.p.m. The fungi tested were as follows:

*Ceratocytis ulmi* _____ CU
*Colletotrichum obiculare* _____ CO
*Fusarium oxysporium* _____ FO
*Helminthosporium sativum* _____ HS
*Rhixoctonia solani* _____ RS
*Verticillium albo-atrum* _____ VA

TABLE III

| | Rate | CU | CO | FO | HS | RS | VA |
|---|---|---|---|---|---|---|---|
| Compound: | | | | | | | |
| 8 | A | 10 | 10 | 10 | 10 | 10 | 10 |
| | B | 10 | 10 | 5 | 10 | 10 | 0 |
| | C | 5 | 0 | 0 | 5 | 5 | 0 |
| 9 | A | 10 | 10 | 10 | 10 | 10 | 10 |
| | B | 8 | 10 | 5 | 8 | 8 | 0 |
| | C | 5 | 0 | 0 | 5 | 5 | 0 |
| 2 | A | 10 | 10 | 10 | 10 | 10 | 10 |
| | B | 10 | 10 | 8 | 10 | 10 | 5 |
| | C | 8 | 10 | 5 | 8 | 10 | 0 |
| 10 | A | 10 | 10 | 5 | 8 | 10 | 5 |
| | B | 8 | 2 | 2 | 5 | 8 | 0 |
| | C | 5 | 0 | 0 | 2 | 5 | 0 |
| 3 | A | 10 | 10 | 10 | 10 | 10 | 10 |
| | B | 8 | 10 | 10 | 10 | 10 | 10 |
| | C | 8 | 5 | 8 | 5 | 10 | 0 |
| 11 | A | 10 | 10 | 10 | 10 | 10 | 10 |
| | B | 10 | 10 | 10 | 10 | 10 | 10 |
| | C | 8 | 2 | 5 | 8 | 10 | 10 |
| 7 | A | 10 | 10 | 10 | 10 | 10 | 10 |
| | B | 10 | 10 | 10 | 10 | 10 | 10 |
| | C | 0 | 0 | 5 | 8 | 10 | 0 |

Spore germination tests were carried out as set forth in Table IV. A 1% of the ester in water (10,000 p.p.m.) was prepared and there was also prepared a solution of agar in water. The ether suspension was appropriately diluted with water and mixed with the agar solution to give concentration of ether of 500 p.p.m. (rate A), 100 p.p.m. (rate B), 10 p.p.m. (rate C). 0.3 ml. of the agar material was placed on a microscope slide and a film allowed to form and solidify. Spores of *Alternaria* spp. (AS) and *verticillium albo-atrum* (VA) were dusted on the slides and they were placed in Petri dishes with filter paper and incubated at room temperature for 24 hours. The percent of nongerminated spores was recorded as against a control slide of pure agar containing the spores, 100% nongermination is recorded as 10, 80% nongermination is recorded as 8 and so on to 0 for complete germination.

TABLE IV

|  | Rate | AS | VA |
|---|---|---|---|
| Compound: | | | |
| 8 | A | 5 | 5 |
|  | B | 0 | 0 |
|  | C | 0 | 0 |
| 9 | A | 5 | 5 |
|  | B | 0 | 0 |
|  | C | 0 | 0 |
| 2 | A | 8 | 5 |
|  | B | 0 | 0 |
|  | C | 0 | 0 |
| 10 | A | 5 | 5 |
|  | B | 0 | 0 |
|  | C | 0 | 0 |
| 3 | A | 10 | 10 |
|  | B | 8 | 8 |
|  | C | 5 | 5 |

The compounds were also tested as soil fungicides. 2 grams of the ester were mixed with an equal weight of attapulgus clay (attaclay). This mixture was then blended with soil infested with *Pythium spp*. After blending with the soil, the mixture was allowed to stand for 24 hours. Then the blend was spread evenly over a wet paper towel and 50 pea seeds were placed on the soil. The towels were rolled up and put in metal cans and stored at 40° F. for 5 days and then at 75° F. for 4 days. The cans were then removed and the rate of fungus growth recorded, with 10 indicating no growth (perfect control), and 0 indicating complete growth (no control). The results are set forth in Table V.

TABLE V

|  | 200 p.p.m. | 50 p.p.m. |
|---|---|---|
| Compound: | | |
| 8 | 7 | 3 |
| 9 | 3 | 0 |
| 2 | 8 | 4 |
| 3 | 8 | 7 |
| 11 | 6 | 1 |

Compounds 7 and 10 were ineffective as soil fungicides at rates of 200 p.p.m. or lower.

EXAMPLE IV

The compounds of the present invention were also tested as pre-emergent and post-emergent herbicides using Formulation A at the indicated dosages of active ingredient in lbs./acre. The pre-emergent herbicide results are set forth in Table VI and the post-emergent herbicide results are set forth in Table VII. In Table VI a 0–10 scale is employed with 0 indicating 100% germination and 10 indicating no germination. In Table VII a 0–10 scale is employed with 0 indicating no kill and 10 indicating 100% kill. Since the compounds exhibit only mild herbicide activity (for the most part) as pointed out supra the rates of application to crops can be adjusted to kill nematodes and fungi while not harming the crops.

TABLE VI

| | Lbs./acre | Oats | Sugar beets | Radish | Flax | Wheat |
|---|---|---|---|---|---|---|
| Compound: | | | | | | |
| 12 | 20 | 0 | 0 | 0 | 0 | 0 |
|  | 10 | 0 | 0 | 0 | 0 | 0 |
| 1 | 20 | 1 | 9 | 9 | 6 | 2 |
|  | 10 | 0 | 4 | 5 | 0 | 0 |
| 13 | 20 | 0 | 4 | 5 | 0 | 0 |
|  | 10 | 0 | 0 | 0 | 0 | 0 |
| 14 | 20 | 0 | 0 | 0 | 0 | 0 |
|  | 10 | 0 | 0 | 0 | 0 | 0 |
| 15 | 20 | 3 | 10 | 9 | 7 | 4 |
|  | 10 | 0 | 0 | 0 | 0 | 0 |
| 9 | 20 | 0 | 1 | 3 | 0 | 0 |
|  | 10 | 0 | 0 | 0 | 0 | 0 |
| 2 | 20 | 3 | 9 | 9 | 10 | 5 |
|  | 10 | 0 | 6 | 6 | 3 | 0 |
| 10 | 20 | 0 | 0 | 0 | 0 | 0 |
|  | 10 | 0 | 0 | 0 | 0 | 0 |
| 8 | 20 | 0 | 6 | 6 | 5 | 0 |
|  | 10 | 0 | 0 | 5 | 2 | 0 |
| 16 | 20 | 0 | 0 | 0 | 0 | 0 |
|  | 10 | 0 | 0 | 0 | 0 | 0 |
| 17 | 20 | 3 | 7 | 7 | 0 | 3 |
|  | 10 | 0 | 3 | 2 | 0 | 0 |
| 18 | 20 | 0 | 3 | 2 | 0 | 0 |
|  | 10 | 0 | 0 | 0 | 0 | 0 |
| 19 | 20 | 0 | 0 | 0 | 0 | [1]0 |
|  | 10 | 0 | 0 | 0 | 0 | 0 |
| 20 | 20 | 0 | 2 | 3 | 0 | [1]0 |
|  | 10 | 0 | 2 | 0 | 0 | 0 |
| 21 | 20 | 5 | 3 | 4 | 3 | [1]3 |
|  | 10 | 5 | 3 | 4 | 3 | 2 |
| 22 | 20 | 5 | 3 | 4 | 3 | 2 |
|  | 10 | 0 | 0 | 0 | 0 | [1]0 |
| 5 | 20 | 3 | 6 | 7 | 7 | 0 |
|  | 10 | 0 | 0 | 0 | 0 | 0 |
| 23 | 20 | 4 | 0 | 3 | 4 | [1]3 |
|  | 10 | 1 | 0 | 0 | 1 | 0 |
| 24 | 20 | 0 | 0 | 0 | 0 | [1]0 |
|  | 10 | 0 | 0 | 0 | 0 | 0 |
| 25 | 20 | 0 | 0 | 0 | 0 | [1]0 |
|  | 10 | 0 | 0 | 0 | 0 | 0 |
| 4 | 20 | 1 | 2 | 4 | 2 | [1]3 |
|  | 10 | 0 | 0 | 0 | 0 | 0 |
| 26 | 20 | 0 | 0 | 0 | 0 | [1]0 |
|  | 10 | 0 | 0 | 0 | 0 | 0 |
| 27 | 20 | 0 | 0 | 1 | 3 | [1]0 |
|  | 10 | 0 | 0 | 0 | 0 | 0 |
| 28 | 20 | 3 | 0 | 0 | 0 | [1]6 |
|  | 10 | 0 | 0 | 0 | 0 | 0 |
| 29 | 20 | 2 | 3 | 3 | 3 | [1]3 |
|  | 10 | 2 | 0 | 1 | 3 | 3 |
| 6 | 20 | 0 | 0 | 0 | 2 | [1]3 |
|  | 10 | 0 | 0 | 0 | 2 | 3 |
| 30 | 20 | 0 | 0 | 0 | 0 | [1]0 |
|  | 10 | 0 | 0 | 0 | 0 | 0 |
| 11 | 20 | 7 | 10 | 8 | 6 | [1]7 |
|  | 10 | 7 | 10 | 6 | 5 | 5 |

[1] Japanese millet was used in place of wheat.

TABLE VII

| | Lbs./acre | Oats | Sugar beets | Radish | Flax | Wheat |
|---|---|---|---|---|---|---|
| Compound: | | | | | | |
| 12 | 8 | 0 | 1 | 2 | 0 | 0 |
|  | 2 | 0 | 0 | 2 | 0 | 0 |
| 1 | 8 | 6 | 9 | 7 | 6 | 6 |
|  | 2 | 1 | 8 | 5 | 4 | 3 |
| 13 | 8 | 2 | 8 | 7 | 3 | 0 |
|  | 2 | 0 | 0 | 0 | 0 | 0 |
| 14 | 8 | 3 | 0 | 0 | 3 | 0 |
|  | 2 | 3 | 0 | 0 | 3 | 0 |
| 15 | 8 | 0 | 3 | 4 | 2 | 1 |
|  | 2 | 0 | 0 | 1 | 2 | 0 |
| 9 | 8 | 0 | 2 | 7 | 6 | 0 |
|  | 2 | 0 | 0 | 7 | 4 | 1 |
| 2 | 8 | 7 | 10 | 10 | 10 | 7 |
|  | 2 | 0 | 0 | 0 | 0 | 1 |
| 10 | 8 | 9 | 10 | 10 | 10 | 8 |
|  | 2 | 0 | 2 | 7 | 1 | 0 |
| 8 | 8 | 1 | 10 | 10 | 10 | 3 |
|  | 2 | 0 | 3 | 7 | 6 | 1 |
| 16 | 8 | 0 | 0 | 1 | 1 | 0 |
|  | 2 | 0 | 0 | 1 | 1 | 0 |

TABLE VII—Continued

| | Lbs./acre | Oats | Sugar beets | Radish | Flax | Wheat |
|---|---|---|---|---|---|---|
| 17 | 8 | 0 | 0 | 1 | 1 | 0 |
|    | 2 | 0 | 0 | 0 | 1 | 0 |
| 18 | 8 | 0 | 6 | 8 | 0 | 0 |
|    | 2 | 0 | 0 | 3 | 0 | 0 |
| 19 | 8 | 1 | 1 | 1 | 1 | 1[1] |
|    | 2 | 1 | 1 | 2 | 1 | 0 |
| 20 | 8 | 4 | 3 | 5 | 3 | 4[1] |
|    | 2 | 4 | 5 | 4 | 3 | 3 |
| 21 | 8 | 1 | 3 | 3 | 1 | 0[1] |
|    | 2 | 0 | 1 | 2 | 1 | 0 |
| 22 | 8 | 4 | 6 | 7 | 4 | 5[1] |
|    | 2 | 5 | 4 | 4 | 2 | 3 |
| 5  | 8 | 7 | 7 | 7 | 8 | 6 |
|    | 2 | 4 | 8 | 7 | 8 | 5 |
| 23 | 8 | 1 | 0 | 2 | 0 | 0[1] |
|    | 2 | 1 | 1 | 1 | 0 | 0 |
| 24 | 8 | 0 | 1 | 3 | 3 | 3[1] |
|    | 2 | 0 | 0 | 0 | 1 | 2 |
| 25 | 8 | 0 | 3 | 3 | 2 | 1[1] |
|    | 2 | 0 | 0 | 3 | 0 | 0 |
| 26 | 8 | 1 | 1 | 3 | 3 | 0[1] |
|    | 2 | 1 | 2 | 3 | 2 | 0 |
| 27 | 8 | 3 | 2 | 4 | 3 | 3[1] |
|    | 2 | 1 | 3 | 4 | 4 | 4 |
| 28 | 8 | 2 | 2 | 3 | 1 | 2[1] |
|    | 2 | 0 | 1 | 1 | 2 | 0 |
| 29 | 8 | 1 | 1 | 1 | 0 | 0[1] |
|    | 2 | 0 | 1 | 1 | 0 | 0 |
| 6  | 8 | 0 | 0 | 2 | 1 | 0[1] |
|    | 2 | 0 | 0 | 1 | 0 | 0 |
| 30 | 8 | 6 | 6 | 6 | 3 | 3[1] |
|    | 2 | 1 | 2 | 3 | 1 | 2 |
| 11 | 8 | 1 | 3 | 3 | 2 | 2[1] |
|    | 2 | 1 | 3 | 3 | 1 | 0 |

[1] Japanese millet was used in place of wheat.

What is claimed is:

1. A process of killing fungi comprising applying to the fungi a fungicidally effective amount of a compound having one of the formulae (1) $R_2OOC(CH_2)_nCOOR_1$ (2) $R_2OOCCH=CHCOOR_1$ (3) 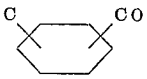

(4) $R_2OOC(CH_2)_mS(CH_2)_mCOOR_1$ where $R_1$ and $R_2$ are (a) mono to trihalo mono to dinitrophenyl or (b) monohalo mono methyl mono nitrophenyl, $n$ is an integer from 0 to 8 and $m$ is an integer from 1 to 3, wherein the halo is chloro or bromo.

2. A process of killing nematodes comprising applying to the nematodes a nematocidally effective amount of a compound having one of the formulae (1) $R_2OOC(CH_2)_nCOOR_1$ (2) $R_2OOCCH=CHCOOR_1$ (3) 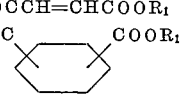

or (4) $R_2OOC(CH_2)_mS(CH_2)_mCOOR_1$ where $R_1$ and $R_2$ are (a) mono to trihalo mono to dinitrophenyl or (b) monohalo mono methyl mono nitrophenyl, $n$ is an integer from 0 to 8 and $m$ is an integer from 1 to 3, wherein the halo is chloro or bromo.

References Cited

UNITED STATES PATENTS

| | | | |
|---|---|---|---|
| 3,148,109 | 9/1964 | Miller | 424—313 |
| 3,242,040 | 3/1966 | Beaver et al. | 424—313 |
| 3,335,172 | 8/1967 | Levin et al. | 71—112 |
| 2,765,224 | 10/1956 | Lambrech | 71—107 |

ALBERT T. MEYERS, Primary Examiner

V. D. TURNER, Assistant Examiner

U.S. Cl. X.R.

71—98, 106, 112; 424—309, 313